(12) United States Patent
Morrell

(10) Patent No.: US 7,690,126 B2
(45) Date of Patent: Apr. 6, 2010

(54) ADJUSTABLE CARPENTER'S MEASURING TOOL

(76) Inventor: Michael F. Morrell, 27023 Rolling Hills Ave., Santa Clarita, CA (US) 91387

( * ) Notice: Subject to any disclaimer, the term of this patent is extended or adjusted under 35 U.S.C. 154(b) by 136 days.

(21) Appl. No.: 12/030,326

(22) Filed: Feb. 13, 2008

(65) Prior Publication Data

US 2009/0199420 A1  Aug. 13, 2009

(51) Int. Cl.
*B43L 7/00* (2006.01)
(52) U.S. Cl. ......................................................... 33/473
(58) Field of Classification Search .................. 33/473, 33/418, 419, 423, 424, 425, 426, 452, 464, 33/531, 534, 535
See application file for complete search history.

(56) References Cited

U.S. PATENT DOCUMENTS

| 148,316 | A | * | 3/1874 | Miller ........................ 33/473 |
| 268,560 | A | * | 12/1882 | Smith et al. ................... 33/473 |
| 282,560 | A | * | 8/1883 | Overend ....................... 33/473 |
| 695,110 | A | * | 3/1902 | Mueller ....................... 33/473 |
| 935,860 | A | * | 10/1909 | Probst ......................... 33/473 |
| 1,636,623 | A | * | 7/1927 | Cash ........................... 33/473 |
| 4,020,560 | A | * | 5/1977 | Heck ........................... 33/265 |
| 4,761,890 | A | | 8/1988 | Morrell |
| 5,226,238 | A | * | 7/1993 | Rahnefeld .................... 33/419 |
| 5,722,175 | A | * | 3/1998 | Slates .......................... 33/265 |
| 6,260,283 | B1 | * | 7/2001 | Abernathy et al. ............ 33/419 |
| 7,243,436 | B2 | * | 7/2007 | Casner et al. ................. 33/473 |

* cited by examiner

*Primary Examiner*—Christopher W Fulton
(74) *Attorney, Agent, or Firm*—Kelly Lowry & Kelley LLP

(57) ABSTRACT

A measuring tool for use particularly in carpentry combines the features of a square, a level and a bevel tool into a single device. The measuring tool includes a handle which supports a slide rule at one end and a pitch slide which can be adjustably positioned within the handle through the advancement and retraction of a thumb bolt into the handle. The thumb bolt may be advanced by either turning the thumb bolt and/or advancing the thumb bolt against a spring biased ratcheting mechanism. The thumb bolt may be retracted either by turning and/or by disengagement of the spring biased ratcheting mechanism.

19 Claims, 2 Drawing Sheets

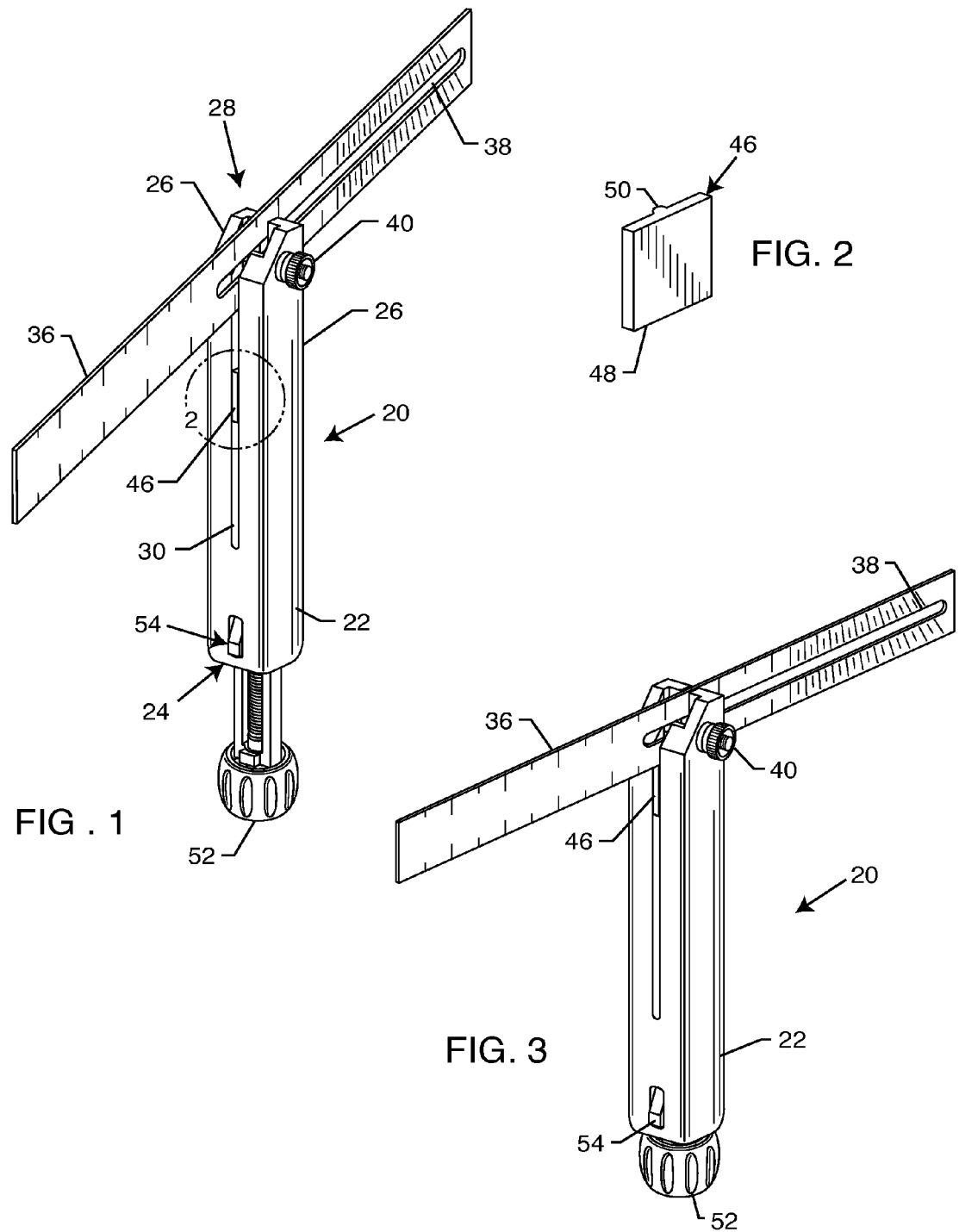

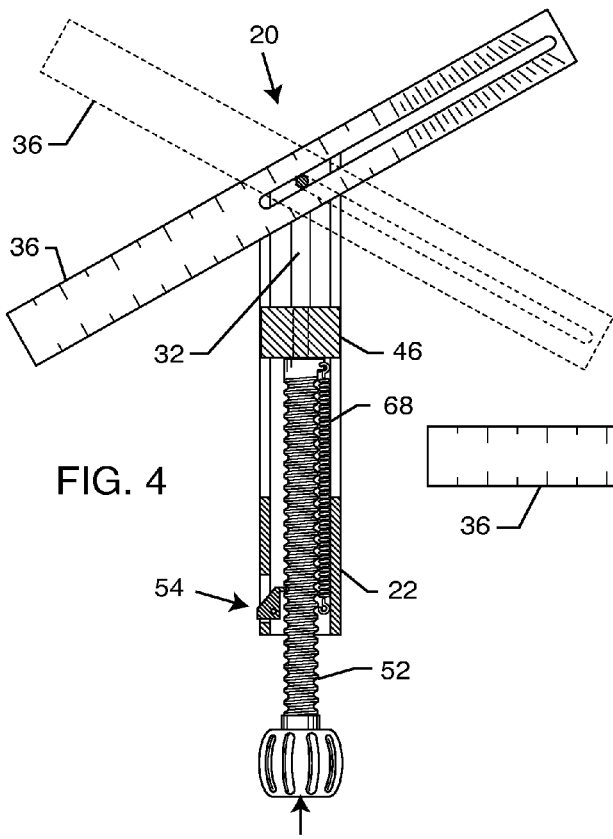
FIG. 4
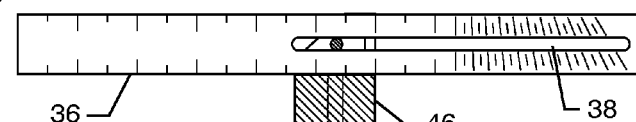
FIG. 5
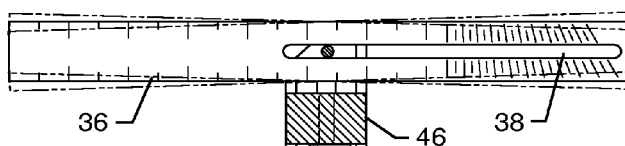
FIG. 6
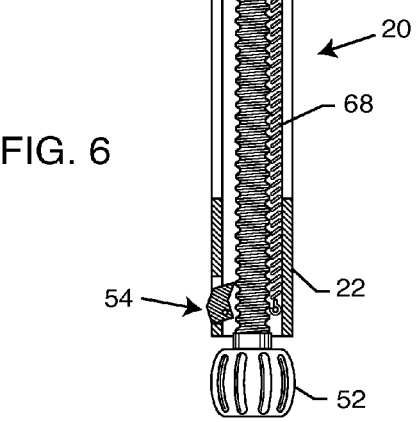
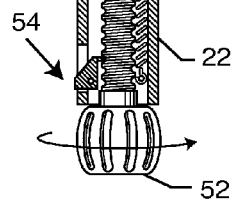
FIG. 7
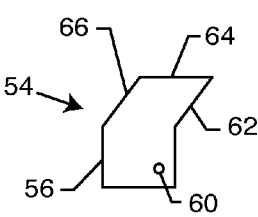
FIG. 8

ADJUSTABLE CARPENTER'S MEASURING TOOL

BACKGROUND OF THE INVENTION

This invention relates generally to hand tools. More specifically, this invention relates to an adjustable measuring tool for use particularly in carpentry which combines the features of a square, a level and a bevel tool into a single device.

A skilled carpenter often utilizes many different types of tools to quickly and economically perform his trade. Some of the more common types of tools used by carpenters include levels, tee-squares, rafter angle squares, carpenter squares, combination squares, rules, knives and gauges, as well as hammers and saws. The particular type of tool used is normally dictated by the task at hand.

Many carpenters have found it necessary to carry with them more tools than desirable as they perform their various work tasks. In some limited accessibility locations, such as encountered when building roofs, it is simply impossible for a carpenter to effectively perform his job while also carrying all of the tools he may need. This often results in wasted time and effort as the builder is forced to move from the work site to retrieve tools as the need arises.

For example, if a carpenter is on a roof during the rafter framing stage, he is typically required to cut and nail a row of freeze blocks around the perimeter of the roof. The correct manner of installing these freeze blocks would be to first snap a line on the top of the rafters after marking the points from which to snap the line from one end to another. To do this correctly and quickly, the carpenter would need a combination square. After this had been accomplished, he would then need to mark and cut the corner blocks. For this he would need a bevel or rafter square. At different points in the process, he may require the use of a level, a rule, a blueprint scale, or one of many other tools carpenters typically and routinely use.

In addition the carpenter may need to quickly and easily adjust the spacing or orientation of any of these tools with one hand while holding material in position with the other hand.

Accordingly, there has been a need for a measuring tool which combines the features of a square, a level and a bevel tool into a single device. Such a tool must be relatively inexpensive, compact, lightweight and durable. Further, a measuring tool is needed which can square, bevel and mark angles in a simple and easy to understand manner. Moreover, such a tool is needed which can perform these tasks with a minimum of adjustment, without requiring disassembly of the tool, and in a quick and easy manner. The present invention fulfills these needs and provides other related advantages.

SUMMARY OF THE INVENTION

The present invention resides in an improved carpentry tool which is durable and of simple construction, and which combines the utilitarian functions of a square, a level, and a bevel tool into a single device. The present invention also incorporates features which allow for quick and easy adjustment of the configuration and settings of the tool.

The measuring tool of this invention comprises, generally, a clevis-like handle having a pair of brackets, a slide rule adjustably fastened between the brackets, a pitch slide positioned between the brackets, and a threaded thumb bolt for adjusting the position of the pitch slide in relation to the slide rule. The tool also comprises a ratcheting mechanism on the thumb bolt for quickly advancing the thumb bolt and pitch slide toward the slide rule without turning the thumb bolt. Further, the tool comprises a releasing mechanism on the thumb bolt for disengaging the ratcheting means and quickly retracting the thumb bolt and pitch slide away from the slide rule without turning the thumb bolt.

The ratcheting means may comprise a ratcheting pawl that engages the threads of the thumb bolt. The ratcheting pawl is spring biased against the thumb bolt and possesses an inclined surface such that when pressure is applied to the end of the thumb bolt it advances into the handle against the force of the spring biasing. A surface of the ratcheting pawl opposite the incline surface is perpendicular to the thumb bolt such that it prevents movement of the thumb bolt out of the handle unless it is released.

The releasing means comprises a thumb release on the ratcheting pawl. The application of pressure to the thumb release pivots the ratcheting pawl away from the thumb bolt such that it no longer engages the threads thereof. The releasing means further comprises a spring connected to the base of the handle and the distal end of the thumb screw. When the thumb release is engaged and the ratcheting pawl is pivoted away from the thumb bolt the spring causes the thumb bolt to automatically retract out of the handle.

The slide rule includes a longitudinal closed slot. A carriage bolt extends through the slot and is anchored at both ends in the bracket members. The carriage bolt fastens the slide rule to the handle. The slide rule includes a linear measurement rule, a blueprint scale, a layout scale, or an angular measurement scale for common rafters or hip-valley rafters Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a perspective view of the preferred embodiment of the adjustable carpenter's measuring tool embodying the invention;

FIG. 2 is a perspective view of the pitch slide which is ordinarily positioned between the brackets of the handle;

FIG. 3 is another perspective view of the measuring tool of FIG. 1

FIG. 4 is a cross-sectional side view of the measuring tool of FIG. 1;

FIG. 5 is a cross-sectional side view of the measuring tool of FIG. 1;

FIG. 6 is a cross-sectional side view of the measuring tool of FIG. 1;

FIG. 7 is an exploded view of the ratcheting pawl shown in FIG. 5; and

FIG. 8 is an exploded view of the ratcheting pawl shown in FIG. 6.

DETAILED DESCRIPTION OF THE PREFERRED EMBODIMENTS

As shown in the drawings for purposes of illustration, the present invention is concerned with an adjustable carpenter's measuring tool, generally designated in the accompanying drawings by the reference number 20. In accordance with the present invention, and as shown in FIGS. 1 through 6, the adjustable tool 20 is capable of squaring, beveling, and measuring angles as required in many carpentry applications without the need to disassemble the tool into specific configurations for particular applications. Further the construction of the tool 20, as described below, permits the economical manufacture of a durable product which is needed by builders of homes and other structures.

The adjustable carpenter's measuring tool 20 comprises a generally rectangular, clevis-like handle 22 having a closed end 24 and a pair of parallel bracket members 26 which extend away from the closed end to an open end 28. The bracket members 26 define a gap 30, in which various other components of the measuring tool 20 are positioned. In the particular embodiment shown, each of the bracket members 26 includes a centrally positioned inward channel 32 which extends within the gap 30 substantially from the closed end 24 to aligned apertures (not shown) provided through the bracket members 26 near the open end 28.

A slide rule 36 is constructed of rectangular stock and includes a longitudinal closed slot 38 centered substantially along its longitudinal axis. The slide rule 36 is positioned between the bracket members 26 of the handle 22 near its upper end 28 so that the closed slot 38 is placed in general alignment with the aligned apertures (not shown). To connect the slide rule 36 to the handle 22, a carriage bolt 40 extends through the aligned apertures (not shown) and the closed slot 38. This attachment of the slide rule 36 to the handle 22 permits pivotal movement of the slide rule and some linear movement of the slide rule 36 along its longitudinal axis with respect to the handle 22. The handle 22, and particularly the bracket members 26, have sufficient flexibility so that when the carriage bolt is tightened, the bracket members 26 will tend to squeeze the portion of the slide rule 36 positioned therebetween and hold the slide rule 36 rigidly in a particular configuration.

A pitch slide 46 includes a rectangular body portion 48 and a ridge-like tongue 50 which extends outwardly from the body portion 48. The pitch slide 46 preferably has a width corresponding to the width of the bracket members 26. The pitch slide 46 is positioned between the bracket members 26 so that the tongue 50 is positioned within an inward channel 32 of one of the bracket members 26. This slide 46 is permitted movement between the closed end 24 of the handle 22 and the slide rule 36 between the bracket members 26 along a track defined by the inward channel 32. The engagement of the tongue 50 within the channel 32 effectively holds the pitch slide 46 in place and prevents any unintended dislodgement from between the bracket members 26.

In order to position the pitch slide 46 in a desired position between the bracket members 26 when the measuring tool 20 is held in an upright position, a thumb bolt 52 is threaded through the closed end 24 of the handle 22. This thumb bolt 52 is caused to extend centrally upwardly into the gap 30 for engaging the bottom end of the pitch slide 46. By simply turning the thumb bolt 52 into or out of the handle 22, the position of the pitch slide 46 within the gap 30 can be determined.

The thumb bolt 52 is engaged by a ratcheting pawl 54 or similar ratcheting mechanism, as illustrated in FIGS. 4-6. As shown in FIG. 7, the ratcheting pawl may comprise a generally rectangular body 56 which has a ratcheting tooth 58 to engage the threads of the thumb bolt 52. The ratcheting pawl 54 is connected to the handle 22 at a pivot point 60. The ratcheting pawl 54 is spring biased such that the ratcheting tooth 58 is pivoted inward to engage the threads of the thumb bolt 52. Alternatively, as shown in FIG. 8, the ratcheting pawl 54 may comprise an inclined surface 62 and an opposing horizontal surface 64.

In either embodiment, ratcheting tooth 58 or inclined surface 62, the thumb bolt 52 may be advanced into the handle 22 simply by pressing on the end of the thumb bolt 52 as indicated by the arrow in FIG. 4. Applying pressure in this way will cause the spring biased ratcheting pawl 54 to pivot away from the threads of the thumb bolt 52, thus allowing the thumb bolt 52 to advance in the handle 22. This advancement of the thumb bolt 52 allows a person using the tool 20 to quickly advance the pitch slide 48 to engagement with the slide rule 36. As shown in FIG. 5, once the pitch slide 46 engages the slide rule 36, the thumb bolt 52 may be further tightened by rotation of the end of the thumb bolt 52 as shown.

The ratcheting pawl 54 also includes a thumb release 66. When pressure is applied, the thumb release 66 causes the ratcheting pawl 54 to rotate about the pivot point 60 and disengage the threads of the thumb bolt 52. When the ratcheting pawl 54 is disengaged from the thumb bolt 52 a spring 68 causes the thumb bolt 52 to retract from the handle 22, thus causing the pitch slide 46 to disengage from the slide rule 36. The spring 68 is connected to the handle 22 adjacent the closed end 24 and is also connected to the thumb bolt 52 adjacent the pitch slide 46. In this configuration as the thumb bolt 52 is advanced into the handle 22, the spring 68 is stretched creating a force intended to retract the thumb bolt 52 from the handle 22. Upon activation of the thumb release 66, the spring 68 causes the thumb bolt 52 to quickly retract from the handle 22.

FIG. 1 shows the tool 20 wherein the thumb bolt 52 is partially retracted and the slide rule 36 is not engaged by the pitch slide 46. FIG. 3 shows the tool 20 wherein the thumb bolt 52 is fully advanced into the handle 22 and the pitch slide 46 is engaged with the slide rule 36. FIG. 5 shows an arrangement similar to FIG. 3 and the further adjustment of the thumb bolt 52 resulting from turning the end thereof, as indicated by the arrow. FIG. 6 shows the engagement of the thumb release 66 on the ratcheting pawl 54 resulting in the release of the thumb bolt 52 and the retraction thereof by the spring 68.

Much of the utility of the measuring tool 20 is derived from the particular scribe markings placed upon the slide rule 36. In particular, and as illustrated, the slide rule 36 is provided with various scales to permit a user to make many useful measurements and conversions.

As illustrated in FIG. 4, the construction of the measuring tool 20 permits the slide rule 36 to be moved freely with respect to the handle 22 in order to obtain a desired configuration of the tool. When it is desirable to place the handle 22 and the slide rule 36 at right angles to one another (as illustrated in FIGS. 3 and 5), all that needs to be done is advance the thumb bolt 52 into the closed end 24 of the handle 22 to place the pitch slide 46 in an abutting relation with the slide rule 36 while it is held in a generally perpendicular relationship to the handle. The thumb bolt 52 may then be tightened down to better secure the abutting relationship. Since the slide rule 36, the pitch slide 46 and the handle 22 are all rectangular, this will necessarily place the handle and the slide rule at right angles to one another.

Alternatively, it may be desirable to align the handle 22 and the slide rule 36 along a common longitudinal axis. In this case, the pitch slide 46 would be retracted (by retracting the thumb bolt 52) from the slide rule to allow rotation of the slide rule generally into the desired aligned configuration. The thumb bolt 52 would then be advanced and tightened as described previously to place the pitch slide 46 into a secure abutting relation with an end of the slide rule 36. The resulting configuration of the measuring tool 20 would be in alignment.

A common task performed by carpenters involves measuring, cutting and attaching wood beams or rafters at particular angles. The measuring and marking tasks are easily accomplished when using the adjustable carpenter's measuring tool 20 of the present invention, since the slide rule 36 can be quickly placed in a desired orientation with respect to the handle 22 by utilizing the various measurement scales. The particular scale used will depend on the particular type of rafter. To hold the slide rule 36 in a desired orientation with respect to the handle 22, after the handle is aligned with a desired scribe marking the pitch slide 46 is positioned by the thumb bolt 52 to just engage the slide rule 36 and prevent any further angular movement of the slide rule toward the plane of the handle. The carriage bolt 40 is then tightened to squeeze the bracket members 26 about the portion of the slide rule 36 positioned therebetween. This has the effect of locking the slide rule in the desired configuration.

From the foregoing, it should be apparent that the adjustable carpenter's measuring tool 20 combines the features of a square, a level, and a bevel tool into a single device. The measuring tool 20 accomplishes this in a relatively inexpensive, compact, lightweight and durable manner. No disassembly of the tool is required to perform its various tasks, and with a minimum of adjustment a carpenter can quickly and easily measure and mark angles for many common tasks encountered on the job.

Although a particular embodiment of the invention has been described in detail for purposes of illustration, various modifications may be made without departing from the spirit and scope of the invention. Accordingly, the invention is not to be limited, except as by the appended claims.

What is claimed is:

1. An adjustable measuring tool, comprising:
a handle forming a pair of brackets, a slide rule adjustably fastened between the brackets, a pitch slide positioned between the brackets, and a threaded thumb bolt for adjusting the position of the pitch slide in relation to the slide rule;
a ratcheting mechanism for quickly advancing the thumb bolt and pitch slide toward the slide rule without turning the thumb bolt; and
a releasing mechanism for disengaging the ratcheting mechanism and quickly retracting the thumb bolt and pitch slide away from the slide rule without turning the thumb bolt, wherein the releasing mechanism comprises a pivoting thumb release associated with the ratcheting mechanism and a spring connecting the handle to the thumb bolt.

2. An adjustable measuring tool as set forth in claim 1, wherein the ratcheting mechanism comprises a ratcheting pawl that engages the threads of the thumb bolt.

3. An adjustable measuring tool as set forth in claim 1, wherein the slide rule includes a longitudinal closed slot through which extends a carriage bolt anchored at both ends in the bracket members for fastening the slide rule to the handle.

4. An adjustable measuring tool as set forth in claim 3, wherein the slide rule includes a linear measurement rule.

5. An adjustable measuring tool as set forth in claim 3, wherein the slide rule includes a blueprint scale.

6. An adjustable measuring tool as set forth in claim 5, wherein in the slide rule includes a layout scale.

7. An adjustable measuring tool as set forth in claim 3, wherein the slide rule includes an angular measurement scale.

8. An adjustable measuring tool as set forth in claim 7, wherein the slide rule includes an angular measurement scale for common rafters.

9. An adjustable measuring tool as set forth in claim 7, wherein the slide rule includes an angular measurement scale for hip-valley rafters.

10. An adjustable measuring tool, comprising:
a handle forming a pair of brackets, a slide rule adjustably fastened between the brackets, a pitch slide positioned between the brackets, and a threaded thumb bolt for adjusting the position of the pitch slide in relation to the slide rule;
a ratcheting pawl which engages the threads thereof for quickly advancing the thumb bolt and pitch slide toward the slide rule without turning the thumb bolt; and
a pivoting thumb release associated with the ratcheting pawl for disengaging the ratcheting pawl from the threads of the thumb bolt, thus allowing a spring connecting the handle to the thumb bolt to quickly retract the thumb bolt and pitch slide away from the slide rule without turning the thumb bolt.

11. An adjustable measuring tool as set forth in claim 10, wherein the slide rule includes a longitudinal closed slot through which extends a carriage bolt anchored at both ends in the bracket members for fastening the slide rule to the handle.

12. An adjustable measuring tool as set forth in claim 11, wherein the slide rule includes a linear measurement rule.

13. An adjustable measuring tool as set forth in claim 11, wherein the slide rule includes a blueprint scale.

14. An adjustable measuring tool as set forth in claim 13, wherein in the slide rule includes a layout scale.

15. An adjustable measuring tool as set forth in claim 11, wherein the slide rule includes an angular measurement scale.

16. An adjustable measuring tool as set forth in claim 15, wherein the slide rule includes an angular measurement scale for common rafters.

17. An adjustable measuring tool as set forth in claim 15, wherein the slide rule includes an angular measurement scale for hip-valley rafters.

18. An adjustable measuring tool, comprising:
a clevis-like handle forming a pair of brackets, a slide rule adjustably fastened between the brackets, a pitch slide positioned between the brackets, and a threaded thumb bolt for adjusting the position of the pitch slide in relation to the slide rule;
a ratcheting pawl on the which engages the threaded thumb bolt for quickly advancing the thumb bolt and pitch slide toward the slide rule without turning the thumb bolt;
a pivoting thumb release associated with the ratcheting pawl for disengaging the ratcheting pawl from the threads of the thumb bolt, thus allowing a spring connecting the handle to the thumb bolt to quickly retract the thumb bolt and pitch slide away from the slide rule without turning the thumb bolt;
wherein the slide rule includes a longitudinal closed slot through which extends a carriage bolt anchored at both ends in the bracket members for fastening the slide rule to the handle; and
wherein the slide rule includes a linear measurement rule, a blueprint scale, a layout scale, and an angular measurement scale.

19. An adjustable measuring tool as set forth in claim 18, wherein the angular measurement scale comprises an angular measurement scale for common rafters or for hip-valley rafter.

* * * * *

UNITED STATES PATENT AND TRADEMARK OFFICE
CERTIFICATE OF CORRECTION

| | | |
|---|---|---|
| PATENT NO. | : 7,690,126 B2 | Page 1 of 1 |
| APPLICATION NO. | : 12/030326 | |
| DATED | : April 6, 2010 | |
| INVENTOR(S) | : Michael F. Morrell | |

It is certified that error appears in the above-identified patent and that said Letters Patent is hereby corrected as shown below:

In column 6, line 62 (claim 19), replace "rafter" with --rafters--.

Signed and Sealed this
Twelfth Day of July, 2011

David J. Kappos
*Director of the United States Patent and Trademark Office*